July 10, 1962  J. C. LEJON  3,044,002
MANUAL TO AUTOMATIC TRANSFER MOTOR CONTROL SYSTEM
Filed March 11, 1959

INVENTOR.
JEAN CHARLES LEJON
BY
ATTORNEY

United States Patent Office 3,044,002
Patented July 10, 1962

3,044,002
MANUAL TO AUTOMATIC TRANSFER MOTOR CONTROL SYSTEM
Jean Charles Lejon, Paris, France, assignor to Societe dite Controle Bailey, Paris, France, a French company
Filed Mar. 11, 1959, Ser. No. 798,788
Claims priority, application France Mar. 15, 1958
7 Claims. (Cl. 318—446)

This invention relates to automatic control apparatus and more particularly to apparatus for transferring from one method of control to another without introducing shock in the control system.

The alternate use of two or more methods of control in a control system is well known to those skilled in the art. For example, the alternate or possible alternate use of servo mechanisms is often desired so that in the event of failure of one mechanism a reserve mechanism will be available to maintain the control system in operation. Another example of the alternate use of two different methods of control is in a control system where provision is made for both automatic control and manual control. At times it is desired to operate the control system manually and a transfer from automatic to manual control is made through the provision of a suitable transfer device which is also effective to return the system to automatic control upon actuation at the end of the period of manual operation.

The problem in transferring control from one mechanism to another is that of equalizing the outputs of the two mechanisms before the transfer is made. If this is not done a shock will be produced in the system.

With presently available equipment, provision is made for manually adjusting the outputs of the two mechanisms at the time of transfer so that a shock in the system will be avoided. While such a manual adjustment may be utilized to achieve the desired transfer, it is objectionable due to the fact that a manual operation is required in systems which are alleged to be automatic.

It is the principal object of this invention to provide a means to transfer the control of a variable from one mechanism to another without manual adjustment of the mechanism.

Another object of this invention is to provide a control circuit for automatically equalizing the output voltages of two electric control mechanisms at the instant of transfer of control from one mechanism to the other.

Figure 1:
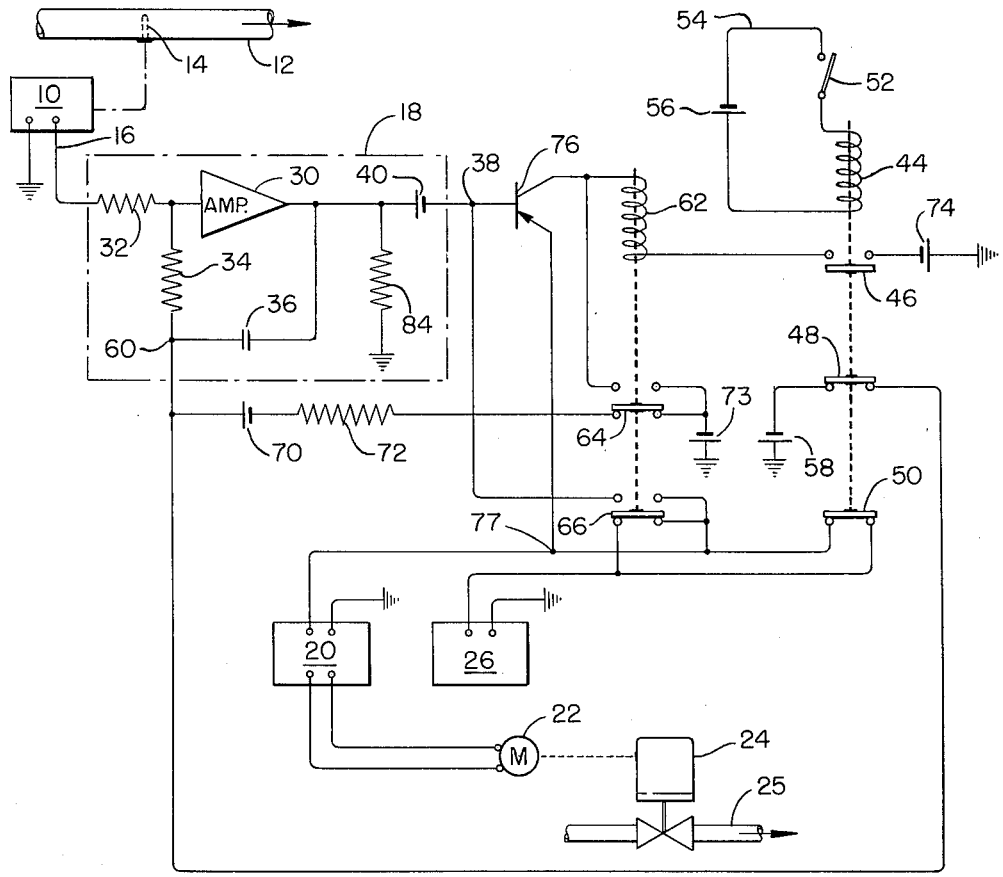
Figure 2:
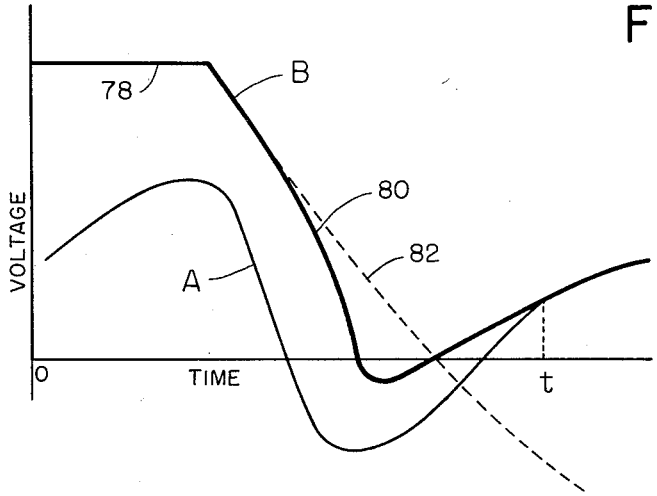

Other objects and advantages will become apparent from the following description taken in connection with the accompanying drawings wherein:

FIG. 1 is a schematic illustration of a control apparatus embodying this invention; and FIG. 2 is a graphical illustration of the operation of the invention.

Referring to FIG. 1 of the drawing, there is shown a transmitting device 10 responsive to the temperature of a fluid in a conduit 12 as sensed by a suitable sensing element such as a thermocouple 14. The transmitter 10 is effective to establish an electric signal at its output terminals representative of the temperature sensed by thermocouple 14. Inasmuch as such transmitting devices are well known to those skilled in the art further description is deemed unnecessary.

The ouput signal of the transmitter 10 is transmitted by a conductor 16 and impressed on the input terminals of a controller such as an operational amplifier indicated generally by the reference numeral 18. As will later be described the controller 18 is effective to amplify the output signal of transmitter 10 to establish a control signal provided with a desired control action such as proportional or proportional plus reset.

By means of a transfer device or switch later to be described the output control signal of the controller 18 may be applied to a device 20 effective to control the operation of an electric motor 22 which in turn is effective to control the position of a control element or valve 24, associated with a conduit 25 to vary the flow rate therein.

With the apparatus thus far described the valve 24 will be positioned by the device 20 in response to variations in temperature as sensed by the thermocouple 14. As an alternate method of controlling the valve 24 there is shown a controller 26 in block diagram which may represent a mechanism responsive to the same or another variable, or for manually establishing an input signal to the device 20 to provide for manual control of the valve 24. In accordance with the objects of this invention means are provided for transferring control of the valve 24 from controller 26 to controller 18 without introducing a shock in the control system. This is accompilshed by blocking the controller 18 at one end of its output signal range during operation of the controller 26. When the transfer of control is to be made the controller 18 is unblocked and an artificial input signal is applied to cause its output to vary over its full range. At the instant when the output signal of the controller 18 is equal to the output signal of the controller 26, the condition of coincidence will automatically effect actuation of switch means which disconnects from the control system the controller 26 and substitutes therefor the controller 18.

Referring now to the circuitry of the controller 18, this component may take various forms but is here shown as comprising a proportional plus reset controller including a high gain low impedance amplifier 30 having an input resistor 32 and a resistor 34 connected in an external feedback circuit in series with a capacitor 36. Reset action is introduced into the amplified output signal at terminal 38 by capacitor 36 while the ratio of resistors 32 and 34 determines the gain of the proportional action. A battery 40 or other suitable D.-C. voltage source is connected in series with the amplifier output to produce an output signal at terminal 38 of single polarity.

Referring now to the means for transferring control from the controller 26 to the controller 18, a main control relay 44 is provided with three switches 46, 48 and 50 which assume the positions shown during deenergization of the relay coil 44. The energizing circuit for the relay coil 44 comprises a manually operable switch 52 connected by a conductor 54 to a suitable D.-C. power source 56. Upon closure of the switch 52 the relay 44 will be energized to actuate the switches 46, 48 and 50 to their opposite positions. The switch 52 is in its open position during operation of the controller 26 but is closed to effect a transfer of control to controller 18.

The switch 48 is effective in the deenergized condition of relay 44 to connect the negative side of a D.-C. voltage source 58 to a terminal 60 between capacitor 36 and resistor 34, to thus apply a constant negative voltage to one side of the capacitor 36 when the controller 18 is inoperative in the control system. In effect the application of this negative voltage to the capacitor 36 serves to block the amplifier 30 and charge the capacitor 36. With these conditions a maximum output signal is produced at output terminal 38.

The switch 46 is effective upon energization of the relay 44 to complete an energizing circuit for a second transfer relay 62 which is provided with a pair of single pole double throw switches 64 and 66. The switch 64 is effective in one position thereof during deenergization of relay 62 to complete a circuit from terminal 60 to ground through D.-C. source 70, resistor 72, and D.-C. source 73. In the other position of the switch 64 assumed upon energization of the relay 62 the source 73 is connected to one side of the relay 62 to establish a holding circuit therefor.

The switch 66 is effective in its position assumed during deenergization of relay 62 to connect the controller 26 to the device 20 and in its other position assumed during energization of relay 62 to connect the output of controller 18 to the positioning device 20. The switch 50 actuated by relay 44 is connected in a shunt circuit with switch 66 to provide a direct energizing circuit from the controller 26 to the positioning device 20 immediately upon the switch 52 being opened.

As will presently be described in more detail the switch 46 is effective upon energization of relay 44 to complete an energizing circuit for the relay 62 through battery 74. To control the instant of energization of relay 62 a transistor 76 is provided having its base connected to the output terminal 38, its emitter connected to terminal 77 and its collector connected to one side of the relay coil 62. With this arrangement no current will flow through the relay coil 62 as long as the potential at terminal 38 is more positive than the potential at terminal 77 which is the output potential of the controller 26.

In the condition of the circuit shown in FIG. 1, switch 52 is open to deenergize relay 44 and switch 46 is open to deenergize relay 62 thereby causing the switch 66 to connect the controller 26 directly to the positioning system 20. Accordingly, the controller 18 is ineffective in the control of valve 24.

During deenergization of relay 62, the switch 64 is effective to connect the terminal 60 to ground through the D.-C. sources 70, 73 and resistor 72. However, the switch 48 of relay 44 is effective to also connect source 58 between the terminal 60 and ground in a separate circuit. Preferably, the voltage of source 73 is greater than the voltage of source 58, and the voltage of source 70 is greater than that of source 73. Resistor 72 is sized to produce a large voltage drop in its circuit causing the voltage at terminal 60 to depend only on the voltage of source 58 with the circuit conditions illustrated. The application of the negative voltage of source 58 to terminal 60 in effect blocks the amplifier 30 and charges the capacitor 36 causing the controller 18 to produce its maximum output voltage at terminal 38.

The circuit conditions described above exist during operation of the system when the switch 52 is open and the valve 24 is controlled from controller 26. It will be apparent that if the controller 26 is responsive to a variable its output may fluctuate widely such as indicated by curve A of FIG. 2. On the other hand the output of controller 18 will be constant at its maximum value as indicated by the segment 78 of curve B shown in FIG. 2. At the instant of transfer it is necessary that these two outputs be equal to avoid a shock in the control system. Thus unless the two outputs are equal when transfer is made the valve 24 will immediately be positioned an amount corresponding to the difference in signal values and cause a system upset.

To initiate a transfer of control from controller 26 to controller 18, the switch 52 is closed manually to energize relay 44 and actuate switches 46, 48 and 50. When the switch 48 is actuated the source 58 is disconnected from the terminal 60. The voltage at terminal 60 will then increase due to the increase in charge of capacitor 36 across resistors 72 and 84. This in effect will gradually decrease the voltage at output terminal 38 of the controller 18 as indicated by segment 80 of curve B. In the absence of an input signal to the controller 18 the curve segment 80 would be saw-tooth as indicated by dotted line 82. For purposes of illustration however, it is assumed that an input signal exists to produce the non-linear segment 80.

Considering now the effect of actuation of the switches upon energization of relay 44, actuation of switch 50 is effective to break the shunt circuit previously described around switch 66. Actuation of switch 46 is effective to connect one side of the relay coil 62 to the source 74.

While switch 46 closes instantaneously upon energization of relay coil 44, energization of relay coil 62 will not occur until the transistor 76 becomes conductive. As shown by curves A and B the output of controller 18 at terminal 38 is initially more positive than the output of controller 26, and therefore the energizing circuit for the relay coil 62 will not be completed until the transistor conducts at time $t$ when the two voltages are equal as indicated by the intersection of curves A and B. At this instant of coincidence the relay 62 will be energized to actuate switch 66 and transfer control to the controller 18.

Switch 64 is actuated upon energization of relay coil 62 to connect the relay 62 to ground through source 73, which is smaller in magnitude than source 74, to establish a holding circuit which maintains energization of the relay 62 even though the transistor 76 becomes non-conductive. Thus, relay 62 will remain energized until the switch 52 is opened to transfer control back to controller 26 at which time the switch 46 will break the energizing circuit.

With the arrangement shown when switch 52 is open to transfer control back to controller 26, the switch 50 will be immediately closed to complete the shunt circuit previously described and therefore instantaneously connect the controller 26 to the positioner 20. Such an arrangement is sufficient in some applications for example as where the controller 26 is a manual voltage supply. However, if the controller 26 should be similar in circuitry and function to the controller 18 it would be desirable to also employ the reset capacitor of controller 26 to generate a saw-tooth voltage and provide a similar means for transferring control in the opposite direction.

The advantages of the invention will now be apparent. A bumpless transfer is always assured since energization of the transfer relay 62 cannot occur until the outputs of the two controllers are equal. At the same time, however, the cost of the circuitry is minimum since the reset capacitor of controller 18 is employed to generate the saw-tooth voltage utilized to establish coincidence between the controller outputs. Thus, while affording many advantages over prior art systems the invention is of low cost and simple in construction.

While only one embodiment of the invention has been herein shown and described, it will be apparent to those skilled in the art that many changes may be made in the construction and arrangement of parts without departing from the scope of the invention as defined in the appended claims.

What is claimed as new is:

1. In a control system having at least two separate control mechanisms for controlling the positioning of a control element, the combination comprising, a transfer device operative between positions for transferring control of the control element between the two mechanisms, means responsive to coincidence of the outputs of the mechanisms for actuating said transfer device, means for initiating transfer of the controlling of the positioning of the control element from one control mechanism to the other and means made operable by operation of said last named means for effecting variation of the output of one of the mechanisms through a predetermined range to establish said coincidence to thereby effect operation of said last named means.

2. In a control system having at least two separate mechanisms for controlling the positioning of a control element, the combination comprising, a transfer device effective in one position thereof to connect the output of one of the mechanisms to the control element and in a second position to connect the output of the other mechanism to the control element, means for blocking the output of one of the mechanisms at one end of its range of variation during control of the control element from the other mechanism, means responsive to coincidence of the outputs of the mechanisms for actuating said transfer device between said positions to effect transfer of control of the control element from one of said mechanisms to the other, a manually operative member movable from one position to another for initiating a transfer of control from one mechanism to the other, and means responsive to actuation of said member for effecting variation of the output of said blocked control mechanisms toward the other end of its output signal range to effect operation of said coincidence responsive means and actuation of said transfer device.

3. In an electric control system, the combination comprising, a control element movable between positions for varying the value of a variable, a first electric control mechanism responsive to the magnitude of the variable for actuating said control element between said positions, a second electric control mechanism for actuating said control element independently of said first mechanism, a transfer switch having a first position for connecting the output of said first mechanism to said control element and a second position for connecting the output of said second mechanism to said control element, and circuit means responsive to a condition of coincidence of the outputs of said mechanisms for actuating said transfer switch between said positions.

4. In an electric control system, the combination comprising, a control element movable between positions for varying the value of a variable, a first electric control mechanism responsive to the magnitude of the variable for actuating said control element between said positions, a second electric control mechanism for actuating said control element independently of said first mechanism, a transfer switch having a first position for connecting the output of said first mechanism to said control element and a second position for connecting the output of said second mechanism to said control element, circuit means responsive to a condition of coincidence of the outputs of said mechanisms for actuating said transfer switch between said positions, and circuit means operative to effect variation of the output of one of said mechanisms over a predetermined range until coincidence is established.

5. In an electric control system, the combination comprising, a control element movable between positions for varying the value of a variable, a first electric control mechanism responsive to the magnitude of the variable for actuating said control element between said positions, said first control mechanism comprising an electronic amplifier having an external feedback circuit containing a capacitor for introducing reset characteristics in the output signal of said first control mechanism, a second electric control mechanism for actuating said control element independently of said first mechanism, a transfer switch for selectively applying the outputs of said mechanisms to effect positioning of said control element, a relay coil for actuating said transfer switch between positions, an energizing circuit for said relay, a transistor responsive to a condition of coincidence of the outputs of said mechanisms for completing said energizing circuit to effect actuation of said transfer switch, a circuit including said capacitor for producing variation in the output of said first mechanism over its output range to establish said condition of coincidence, and manually operative means for conditioning said energizing circuit for completion by said transistor.

6. In an electric control system as claimed in claim 5 wherein a circuit is provided for applying a predetermined voltage to said capacitor during control of said control element from said second mechanism to block the output of said first mechanism at one end of its output signal range, and said coincidence establishing circuit is effective to unblock said first mechanism to effect variation of its output to the other end of its range until coincidence is established.

7. A control system including a first control circuit and a replacement control circuit, each control circuit being arranged to receive an input signal variable in relation to a variable to be controlled and to provide an electrical output signal for operating means controlling the variable, and transfer means for substituting the replacement control circuit for the first control circuit comprising means for supplying an artificial input to the replacement circuit adapted to give an output signal from the replacement circuit which varies throughout the normal range of values of the output signal from the replacement circuit when in operation in the control system and to connect the output of the replacement circuit into the control system and at the same time to disconnect the output signal from the first control circuit from the control system when the output signal from the replacement control circuit and the output signal from the first control circuit have the same value, the transfer means being adapted to block the output from the replacement circuit at a limit of its operational output signal value while the first circuit is connected into the control system.

References Cited in the file of this patent
UNITED STATES PATENTS

| | | |
|---|---|---|
| 2,589,834 | MacCallum | Mar. 18, 1952 |
| 2,734,155 | Schuck | Feb. 7, 1956 |
| 2,871,436 | Pafferty | Jan. 27, 1959 |
| 2,945,170 | Jones et al. | July 12, 1960 |

OTHER REFERENCES

Termon, F. E.: Electronic and Radio Engineering, fourth edition, page 623, FIG. 18–8, McGraw-Hill, New York, 1955.